US010654149B2

(12) United States Patent
Carder et al.

(10) Patent No.: US 10,654,149 B2
(45) Date of Patent: *May 19, 2020

(54) ABRASIVE RECYCLING SYSTEM (71) Applicant: ZULUBOY, INC., Kent, OH (US)

(72) Inventors: Adam Paul Carder, Copley, OH (US); Richard Ralph Ward, Tallmadge, OH (US)

(73) Assignee: Hypertherm, Inc., Hanover, NH (US)

(*) Notice: Subject to any disclaimer, the term of this patent is extended or adjusted under 35 U.S.C. 154(b) by 76 days.

This patent is subject to a terminal disclaimer.

(21) Appl. No.: 15/230,057

(22) Filed: Aug. 5, 2016

(65) Prior Publication Data
US 2017/0036322 A1 Feb. 9, 2017

Related U.S. Application Data (60) Provisional application No. 62/202,055, filed on Aug. 6, 2015.

(51) Int. Cl.
B24C 9/00 (2006.01)
B24C 1/04 (2006.01)
(52) U.S. Cl.
CPC .............. B24C 9/006 (2013.01); B24C 1/045 (2013.01); Y02P 70/179 (2015.11)
(58) Field of Classification Search
CPC ......... B24C 9/006; B24C 3/065; B28D 5/007; B28D 1/025
USPC ............................ 451/87, 88, 75, 39, 40, 60
See application file for complete search history.

(56) References Cited

U.S. PATENT DOCUMENTS

| 2,347,334 | A | 4/1944 | Schmieg |
| 3,149,445 | A | 9/1964 | Nolan |
| 3,824,738 | A | 7/1974 | Hall et al. |
| 3,863,394 | A | 2/1975 | Dumentat |
| 3,865,629 | A | 2/1975 | Dankoff et al. |
| 3,913,271 | A | 10/1975 | Boettcher |
| 4,120,121 | A | 10/1978 | Surman |
| 4,671,708 | A | 6/1987 | Hurd |
| 4,702,042 | A | 10/1987 | Herrington et al. |
| 4,704,823 | A | 11/1987 | Steinback |

(Continued)

FOREIGN PATENT DOCUMENTS

WO     WO 0053382 A2 * 9/2000

OTHER PUBLICATIONS

Notice of Allowance dated Nov. 10, 2016 U.S. Appl. No. 14/815,712, filed Jul. 31, 2015.

(Continued)

Primary Examiner — George B Nguyen
(74) Attorney, Agent, or Firm — David B. Tingey; Bryant J. Keller; Kirton McConkie (57) ABSTRACT An automatically adjustable abrasive recycling system is provided. The abrasive recycling system includes one or more sensors configured to sense at least one characteristic of the abrasive recycling system, and slurry supply mechanism that operates, at least in part, based upon the sensed characteristic to control the operation of the abrasive recycling system. The abrasive recycling system further includes a substantially vertically arranged configuration of component parts. Methodology corresponding to the automatic operation of the abrasive recycling system is also provided.

20 Claims, 5 Drawing Sheets

(56) References Cited

U.S. PATENT DOCUMENTS

| | | | |
|---|---|---|---|
| 4,719,721 A | | 1/1988 | Stump |
| 4,800,063 A | | 1/1989 | Mierswa et al. |
| 4,827,678 A | | 5/1989 | MacMillan |
| 4,943,368 A | | 7/1990 | Gilbert et al. |
| 5,071,541 A | * | 12/1991 | Thompson ............... B03B 4/00 209/19 |
| 5,231,804 A | | 8/1993 | Abbott |
| 5,527,204 A | | 6/1996 | Rhoades |
| 5,595,461 A | | 1/1997 | Miller |
| 5,637,029 A | | 6/1997 | Lehane |
| 5,799,643 A | | 9/1998 | Miyata et al. |
| 5,911,959 A | | 6/1999 | Wold et al. |
| 6,090,197 A | | 7/2000 | Vivian et al. |
| 6,120,351 A | | 9/2000 | Zeng |
| 6,328,638 B1 | * | 12/2001 | Hopkins ............... B24C 9/006 451/38 |
| 6,361,416 B1 | | 3/2002 | Hopkins et al. |
| 6,362,103 B1 | | 3/2002 | Watts |
| 6,372,111 B1 | | 4/2002 | Watts |
| 6,461,524 B1 | | 10/2002 | Tsuihiji et al. |
| 6,805,618 B1 | | 10/2004 | Ward et al. |
| 7,282,074 B1 | | 10/2007 | Witter |
| 7,585,201 B2 | | 9/2009 | Kanai et al. |
| 7,775,854 B1 | | 8/2010 | Boman et al. |
| 8,147,293 B2 | | 4/2012 | Hashish |
| 8,771,040 B1 | | 7/2014 | Lyras |
| 9,022,835 B1 | | 5/2015 | Gus |
| 9,573,248 B2 | * | 2/2017 | Bernard ............... B24C 9/006 |
| 9,579,773 B2 | | 2/2017 | Adams |
| 2003/0092364 A1 | | 5/2003 | Erickson et al. |
| 2007/0218808 A1 | | 9/2007 | Shimizu |
| 2008/0014837 A1 | | 1/2008 | Fujinaga |
| 2014/0045409 A1 | | 2/2014 | Zhang et al. |

OTHER PUBLICATIONS

Notice of Allowance dated Feb. 8, 2017 from U.S. Appl. No. 14/815,744, filed Jul. 31, 2015.

Office action dated Aug. 11, 2016 from U.S. Appl. No. 14/815,712, filed Jul. 31, 2015.

Office action dated Aug. 19, 2016 from U.S. Appl. No. 14/815,744, filed Jul. 31, 2015.

* cited by examiner

ABRASIVE RECYCLING SYSTEM

CROSS-REFERENCE TO RELATED APPLICATION(S)

This application claims priority to U.S. Provisional Application Ser. No. 62/202,055 to Carder et al., entitled "ABRASIVE RECYCLING SYSTEM," filed Aug. 6, 2015, the disclosure of which is incorporated entirely herein by reference.

BACKGROUND

Abrasive jet cutting, such as waterjet cutting, is often used during fabrication of a work piece, such as a machine part, and is especially useful when the materials being en are sensitive to the high temperatures generated by other cutting methods. It is desirable to recycle the abrasive material used by abrasive jet cutting machines. Abrasive recycling systems can be utilized to achieve this recycling objective, and maximum recycling output can be a primary focus. During operation of these recycling systems a trained operator may need to closely observe the recycling system in order to determine what changes may be required to achieve a desired outcome. Furthermore, the operator often relies on visual inspection methods to gauge the effectiveness of the recycling system. Generally, the operator would then make adjustments to the recycling system in an attempt to increase the recycling system's efficiency. The visual method of inspection is useful, but can lead to errors and inefficiencies. Thus, a need exists for a more efficient abrasive recycling system that is easier to use with little to no input from an operator.

SUMMARY

A described aspect provides a liquid jet abrasive recycling system that will adjust a feature of the recycling system based on one or more sensed characteristics of the recycling system. In one exemplary embodiment, the liquid jet abrasive recycling system may include a slurry supply mechanism associated with a liquid jet cutting tool, wherein the slurry supply mechanism is configured to control the input of slurry from the liquid jet cutting tool into the liquid jet abrasive recycling system. The abrasive recycling system may also include a dryer in fluid communication with the slurry supply mechanism, the dryer configured to remove liquid from the slurry, and a sensor monitoring at least one characteristic of the abrasive recycling system, the sensor being in electronic communication with the slurry supply mechanism, wherein the slurry supply mechanism operates, at least in part, based upon the at least one monitored characteristic.

Another described aspect provides a liquid jet abrasive recycling system having component parts thereof being structurally arranged to maximize, maintain, or produce a sufficient material output while minimizing the ergonomic footprint of the system.

BRIEF DESCRIPTION OF THE DRAWINGS

The described aspects are best understood from the following detailed description when read in connection with the accompanying drawing(s). Included in the drawing(s) the following are figure(s).

DETAILED DESCRIPTION

While this disclosure contains many specific details, it should be understood that various changes and modifications may be made without departing from the scope of the technology herein described and the appended claim(s). The scope of the technology shall in no way be construed as being limited to the number of constituting components, the corresponding relationship, if any, of constituting components, the materials thereof, the shapes thereof, the relative arrangement thereof, the temperature employed, the order of combination of constituents thereof, etc., and are disclosed simply as examples. The depictions and schemes shown herein are intended for illustrative purposes and shall in no way be construed as being limiting in the number of constituting components, connectivity, methodological steps, the materials thereof, the shapes thereof, the relative arrangement thereof, the order of system interactions thereof, etc., and are disclosed simply as an aid for understanding. The features and advantages of the described embodiments are illustrated in detail in the accompanying drawing(s), wherein like reference numerals refer to like elements throughout the drawing(s). As a preface to the detailed description, it should be noted that, as used in this specification and the appended claim(s), the singular forms "a", "an" and "the" include plural referents, unless the context clearly dictates otherwise.

Figure 1:
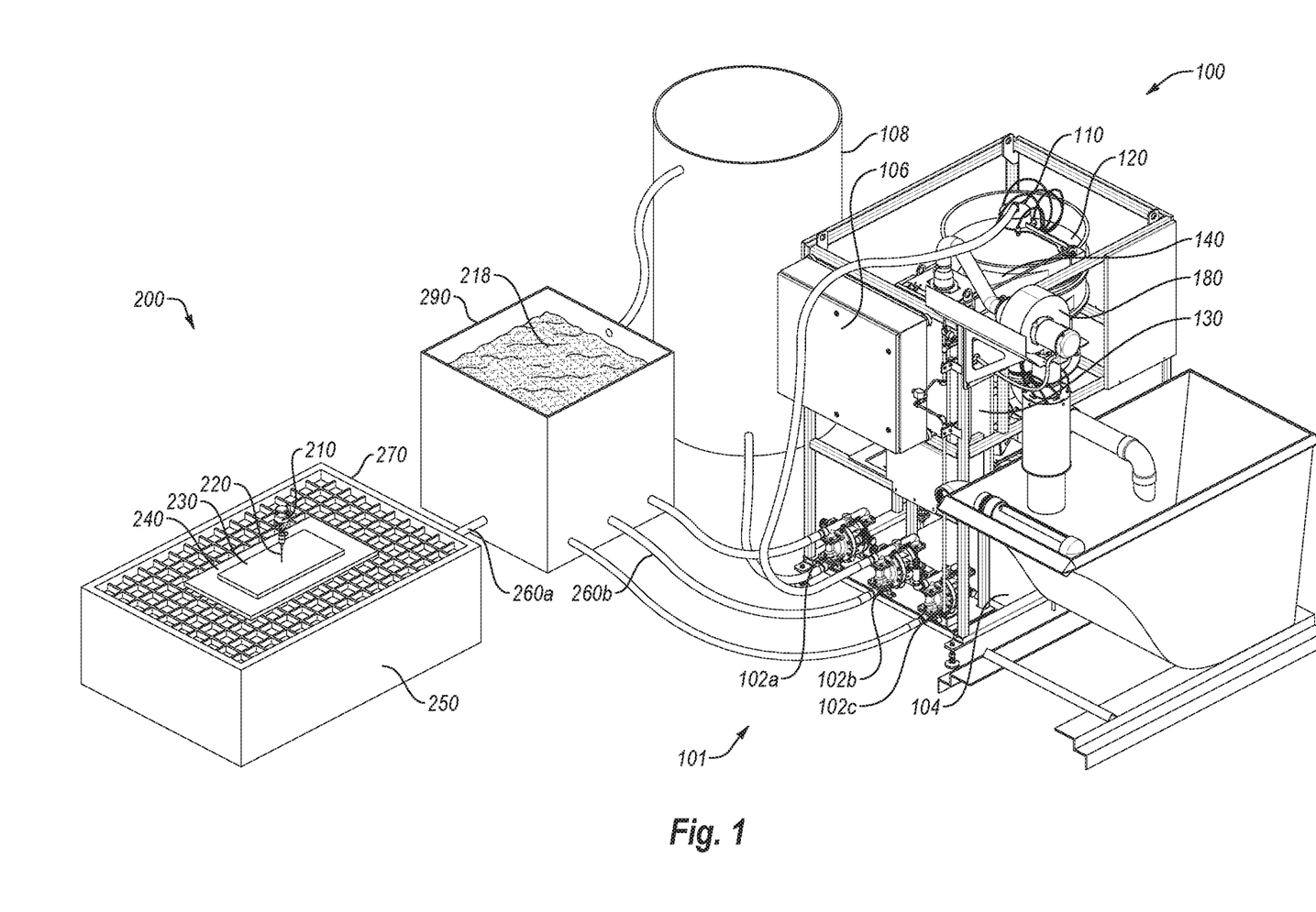
FIG. 1 is a perspective view of a liquid jet abrasive recycling system.

With reference to the drawing(s), FIG. 1 depicts a perspective view of an abrasive recycling system 100 associated with a liquid jet machine 200. The liquid jet machine 200 can be a liquid jet cutting tool, such as a water jet machine, capable of removing material from a work piece 230 to create a desired form or part. Typically, a liquid jet machine 200 utilizes abrasive 220 to facilitate the removal of material, or in other words, to cut the work piece 230 to the desired shape.

In the illustrated embodiment, the liquid jet machine or cutting tool 200 can include a liquid jet 210 through which abrasive 220 is expelled onto the work piece 230 to remove material from the work piece 230. The expelled abrasive 220, along with portions of the work piece 230 and portions of a sacrificial underlayment 240, can be collected in a collection bin 250 thereby forming a used mixture 218. The used mixture 218 can be transported to the abrasive recycling system 100 by a transport hose 260, for example. Also, the used mixture 218 can be transported to abrasive recycling system 100 via an intermediate bin or collector 290, when the abrasive recycling system 100 and the liquid jet cutting tool 200 are in close proximity, such as in the same building, for example. In this example, the used mixture 218 can be transported to the bin 290 by, for example, a hose 260a. Then, another hose 260b can be connected to the bin 290 on one end and then on the other end be connected to the abrasive recycling system 100. In this manner, the abrasive recycling system 100 can be associated with the liquid jet cutting tool 200, and can be described as being on demand or real-time. Furthermore, the abrasive recycling system 100 is associated with the liquid jet cutting tool 200 when both are on site. It is contemplated, however, that once the used mixture 218 is positioned the bin 290, the bin 290 does not need to be fluidly connected, such as by a hose for example, to the collection bin 250 in order to operate the abrasive recycling system 100. As used herein, the liquid jet cutting tool 200 can include the intermediate bin or collector 290.

The liquid jet cutting tool 200 can be various machines designed to expel abrasive sufficient to impact or otherwise erode a work piece. For example, in one embodiment, the liquid jet cutting tool 200 is a water jet machine. In another embodiment, the liquid jet cutting tool 200 can be an abrasive jet machine. Reference to the used mixture 218 will generally be referred to hereinafter as a slurry or an abrasive slurry, which implies a mixture of water and other material. However, this reference does not limit the used mixture to only those that contain water, as the case may be.

Figure 3:
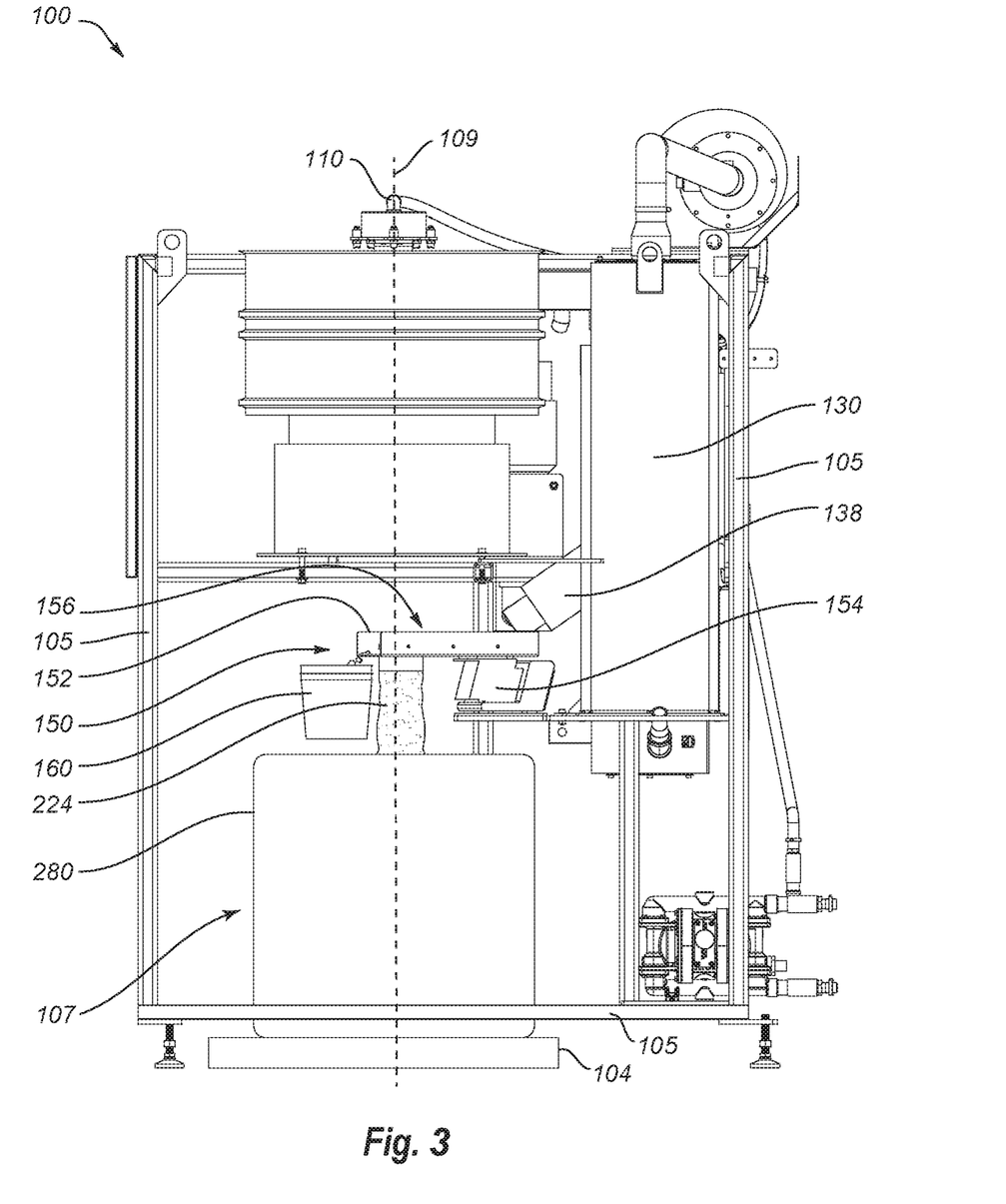
FIG. 3 is a side elevation view of the abrasive recycling system.

In the illustrated embodiment, with reference being made to FIG. 1, the abrasive recycling system 100 may include an inlet 110 through which the abrasive slurry 218 may enter, a drying apparatus 130 fluidly coupled to the inlet 110 and used to remove moisture from the slurry 218, and a secondary screening assembly 150 (see FIG. 3). The abrasive recycling system 100 may also include a slurry supply mechanism 101 having one or more pumps 102. In the illustrated embodiment, the abrasive recycling system 100 includes a first pump 102a configured to pump water from a water supply 108, such as a tank or even the cutting table 250 itself, to the intermediate collector 290, a second pump 102b configured to pump the slurry 218 from the intermediate collector 290 to the inlet 110, and a third pump 102c configured to pump fluid, such as water or air, into the intermediate collector 290 to agitate the slurry 218 contained in the intermediate collector 290. Alternatively, the water or air inserted into the intermediate collector 290 may be pumped, or otherwise inserted, by the water supply 108 or the cutting table 250, depending on the application. The abrasive recycling system 100 may also include a sensor 104, a load cell in some embodiments and a camera in some embodiments, configured to measure the weight or view the level of recycled abrasive material 224 processed by the abrasive recycling system 100. Furthermore, a control box or computing device 106 can be in electronic communication with the pumps 102a, 102b, 102c via one or more wires, and may be employed to assist with controlling various aspects of the abrasive recycling system 100. Alternatively, the computing device 106 may be in wireless electronic communication with the pumps 102a, 102b, 102c to assist with controlling various aspects of the abrasive recycling system 100. The sensor 104 and computing device 106 will be described more fully hereinafter.

The inlet 110 may include an initial screen 120, such as a primary screen, onto which the abrasive slurry 218 is fed. The initial screen 120 may perform a primary screening of the slurry 218 to remove small objects and foreign material from the slurry 218, before the slurry 218 enters the drying apparatus 130, such as a dryer, dryer system, or dryer box. In the illustrated embodiment, the inlet 110 is positioned above a dryer box 130, such that gravity may force the small objects and foreign material through the initial screen and allow the slurry 218 to move through, across, and/or over the initial screen 120. The initial screened slurry 218 moves from the screen 120 to the dryer box 130 thru a channel 140. In this manner, the dryer box 130 is in fluid communication with the inlet 110. The dryer box 130 is adapted to utilize heat and/or air to remove moisture from the slurry 218 to thereby create a dry mixture of abrasive and foreign particles, such as pieces of the work piece 230 or the sacrificial underlayment 240. The dry mixture, i.e., dry abrasive and any remaining particles, come out of dryer box 130 onto the secondary screening assembly 150 where the dry mixture is further refined to obtain recycled abrasive material 224 (as shown in FIG. 3).

The pumps 102 can be configured to influence flow rate of slurry 218 into the abrasive recycling system 100. For example, one or more pumps 102 may be set to operate at a constant rate while one pump 102 is adjustable to influence the flow rate of the slurry 218 into the abrasive recycling system 100. In one embodiment, the second pump 102b and the third pump 102c may be set to operate at a contact rate and the first pump 102a can be adjustable. For example, pump 102b can be arranged to pump material from the intermediate collector 290 to the inlet 110 at a rate of two gallons per minute. The material that is pumped at a particular minute may be one quarter of a gallon of abrasive and one and three quarters of a gallon of water. In a subsequent minute, pump 102b may pump one gallon of abrasive and one gallon of water. In another minute, pump 102b may pump half a gallon of abrasive and one and a half gallons of water. Pump 102c may pump a fluid, such as water or air, into the collector 290 at a predetermined rate that is sufficient to agitate or otherwise mix the slurry 218. Agitation of the slurry 218 by the pump 102c may facilitate or otherwise assist pump 102b with pumping the slurry 218 into the inlet 110 by ensuring the abrasive 220 to water ratio is not too high and thereby clog the pump 102b.

The amount of abrasive 220 pumped from the intermediate collector 290 to the inlet 110 can be influenced by the amount of water pumped into the intermediate collector 290 by the pump 102a. For example, as more water is pumped into the intermediate collector 290 by pump 102a, the percentage of abrasive 220 in the slurry 218 decreases. Likewise, if less water is pumped into the intermediate collector 290 by pump 102a then the percentage of abrasive 220 in the slurry 218 increases. Thus, as the pump 102b moves a constant volume of material into the inlet 110, the amount of abrasive 220 transported by the pump 102b changes according to the percentage of abrasive 220 in the slurry 218. As the percentage of abrasive 220 in the slurry 218 increases (i.e., there is less water in the slurry 218 in the intermediate collector 290), there is more abrasive 220 being pumped into the inlet 110 by pump 102b. Likewise, as the percentage of abrasive 220 in the slurry 218 decreases (i.e., there is more water in the slurry 218 in the intermediate collector 290), there is less abrasive 220 being pumped into the inlet 110 by pump 102b. Therefore, adjustment of the pump 102a can influence the flow rate of abrasive 220 into the inlet 110.

Incorporated herein by reference in its entirety is U.S. Pat. No. 6,805,618 entitled WATER JET ABRASIVE RECYCLING APPARATUS AND METHOD. Therein is disclosed a slurry intake system that may be utilized in connection with the present invention in relation to the pumping of water by pump 102a into the intermediate collector 290, the agitation of the slurry 218 by pump 102c, and the removal of slurry 218 from the intermediate collector 290 by pump 102b. It will be appreciated that pumps 102a, b, c may be in electronic communication one with another via computing device 106 to facilitate the appropriate feeding, such as controlling the feed rate, of slurry 218 into inlet 110.

Figure 2A:
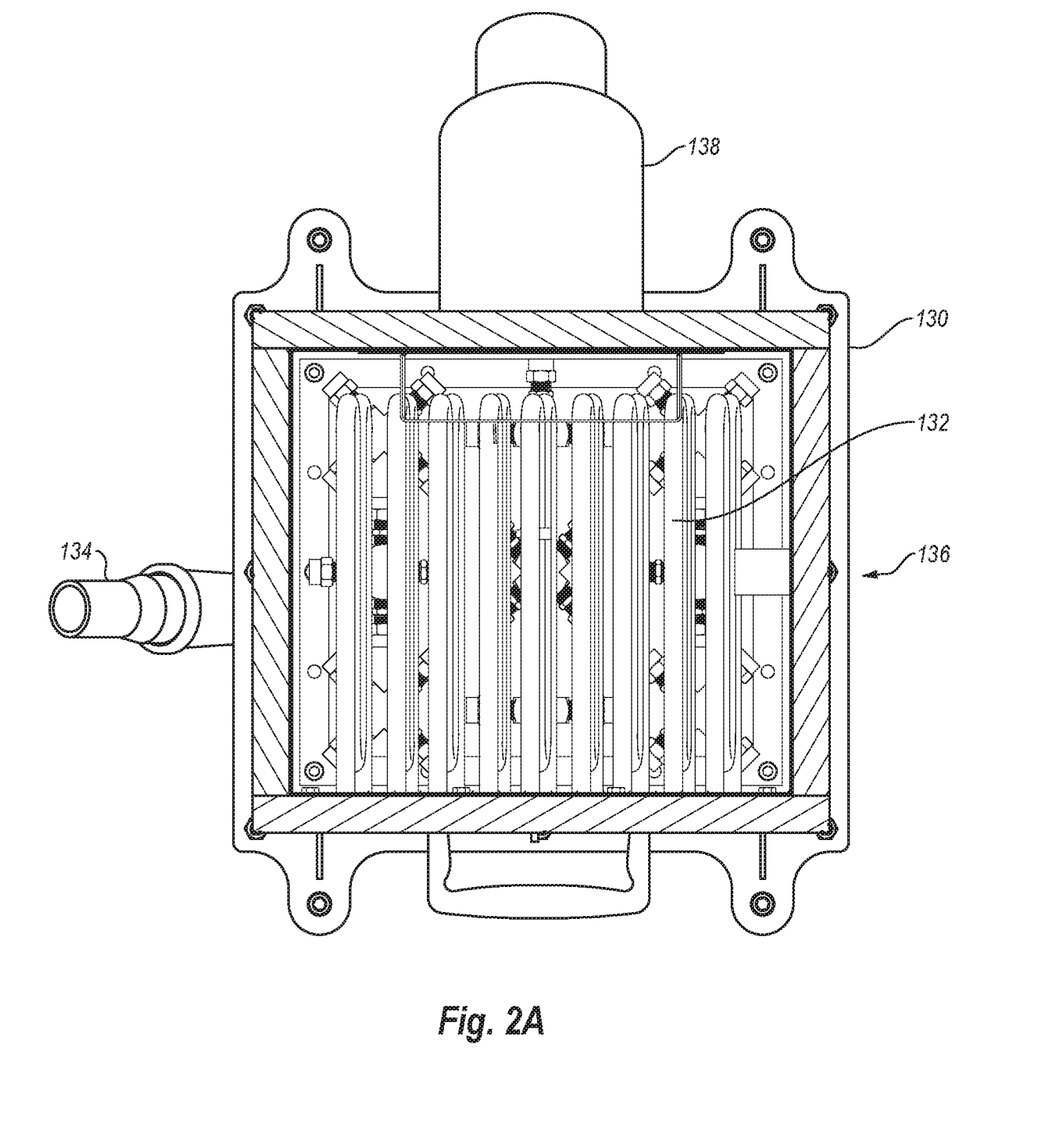
FIG. 2A is a top-down sectional view of a dryer of the liquid jet abrasive recycling system.
Figure 2B:
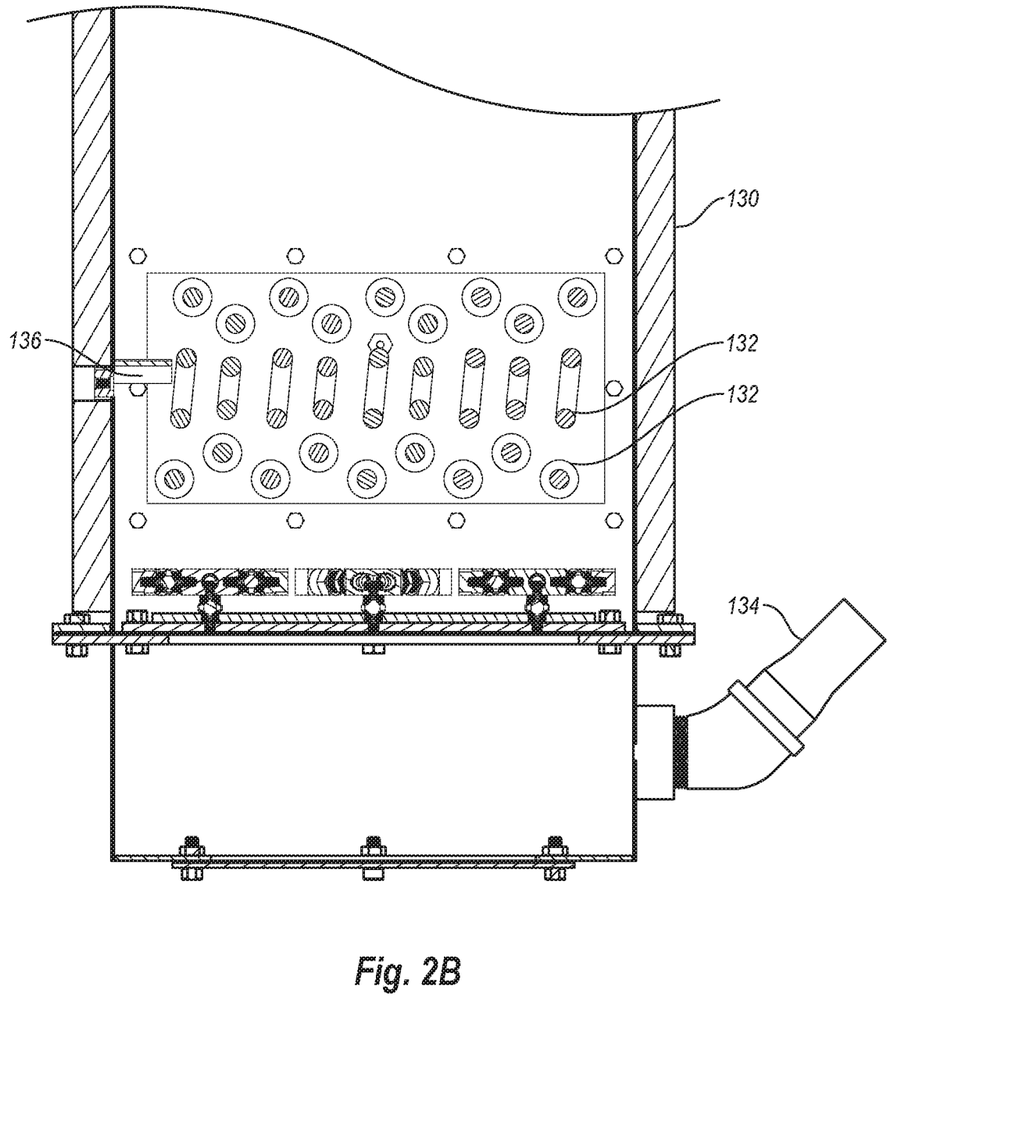
FIG. 2B is a side sectional view of a dryer of the liquid abrasive recycling system.

Various sensors can be employed to influence the operation of the slurry supply mechanism 101. Reference will now be made to FIG. 2A and FIG. 2B to discuss a first sensor 136 associated with the dryer box 130. As slurry 218 moves through the channel 140 from the initial screen 120 it enters the dryer box 130. In the dryer box 130, moisture can be removed from the slurry 218 by one or more of a series of heating elements 132 and air flow entering the dryer box 130 from a blower inlet 134. Heating elements 132 can be configured to heat the slurry 218 and surrounding air to help remove moisture from the slurry 218. In one embodiment, the heating elements 132 can be adjusted so as to heat the slurry 218 to a temperature of 300° F. In order to heat the slurry 218 to 300° F. it may be necessary to drive the heating elements 218 at a higher temperature to accommodate for the heat loss due to the lower temperature of the slurry 218. For example, in embodiments, the heating elements 132 can be driven at 320° F. in order to maintain the slurry 218 at a temperature of 300° F. Further in example, in embodiments, heated air may be forced into dryer box 130 from an external source to keep the heating elements 132 out of direct contact with the slurry 218.

The first sensor 136 may be employed to measure or sense various characteristics of the slurry 218 within the dryer box 130. For example, in one embodiment the first sensor 136 may be a thermocouple. In this embodiment, the sensor 136 is configured to measure the temperature of the slurry 218 within the dryer box 130. The sensor 136 can be positioned so as to remain in substantial contact with the abrasive 220 that has been dried from the slurry 218. In another embodiment, the sensor 136 may be a humidity sensor adapted to measure or sense the amount of moisture in the dryer box 130. It is contemplated that the sensor 136 can be positioned in various positions within the dryer box 130 so as to obtain desirable measurements.

The first sensor 136 can influence operation of the slurry supply mechanism 101. For example, if the first sensor 136 senses that the temperature of the abrasive 220 in the dryer box 130 is too high or that the humidity in the dryer box 130 is too high, this may indicate that there is not enough abrasive 220 entering the inlet 110. In this case, the slurry supply mechanism 101 can be altered to input less water from the water supply 108 into the intermediate collector 290 via pump 102a, thereby increasing the percentage of abrasive 220 in the slurry 218 contained in the intermediate collector 290. Alternatively, if the first sensor 136 senses that the temperature of the abrasive 220 in the dryer box 130 is too low or that the humidity in the dryer box 130 is too low, this may indicate that there is too much abrasive 220 entering the inlet 110 and the dyer 130 is not able to adequately remove moisture from the slurry 218 in an efficient manner. In this case, the slurry supply mechanism 101 can be altered to input more water from the water supply 108 into the intermediate collector 290 via pump 102a, thereby decreasing the percentage of abrasive 220 in the slurry 218 contained in the intermediate collector 290, which will input less abrasive 220 into inlet 110. Inputting less abrasive 220 into inlet 110, and thus into dryer box 130, may allow the heating elements 132 to catch up and suitably heat the abrasive 220 as there is less abrasive 220 in the dryer box 130.

The first sensor 136 can be electrically coupled via one or more wires to the computing device 106 to enable automatic adjustment of the supply of slurry 218 to the abrasive recycling system 100. The first sensor 136 may alternatively be in wireless electronic communication with the computing device 106. In one embodiment, the computing device 106 can include logic and be programmed to control the pump 102a thereby adjusting the flow rate of water from the water supply 108 into the intermediate collector 290. As discussed herein, modification of the amount of water in the intermediate collector 290 influences the amount of abrasive 220 that enters the inlet 110. In this manner, the slurry supply mechanism 101 can operate, at least in part, based upon at least one monitored characteristic that was sensed, measured or otherwise monitored by the first sensor 136. Furthermore, as the monitored temperature and/or the humidity level in the dryer box 130 varies, small adjustments to the pump 102a can be made by the computing device 106 to achieve a more efficient recycling process. Also, it is contemplated that multiple sensors may be employed in the dryer box 136, such as for example, both a temperature sensor and a humidity sensor.

Reference being made to FIG. 3, a second sensor 104 may be employed to measure or monitor a characteristic of the abrasive recycling system 100. The second sensor 104 may be configured to measure or monitor the weight and/or amount of recycled abrasive 224 recycled by the abrasive recycling system 100. In the illustrated embodiment, the abrasive recycling system 100 includes the secondary screening assembly 150. The secondary screening assembly 150 may include a tray 152 for receiving the dry mixture from the dryer box 130, a vibrating feeder 154 to help facilitate transport of the dry mixture along the tray 152, and a secondary screen 156, such as a 30 mesh screen, for example, that allows smaller abrasive particles to drop through into a collection bag, bin or other component 280. This collected material represents the finished recycled abrasive product and end goal of the abrasive recycling system 100. Any material too large to fall through the secondary screen 156 as the screen 156 is agitated by the vibrating feeder 154 will continue on and drop off the end of the tray 152 into a waste bin 160. It is contemplated that the tray 152 and vibrating feeder 154 can be replaced by a conveying system, such as an endless belt, to facilitate transport of the dry mixture from the dryer box 130 to the secondary screen 156. In alternative embodiments, the secondary screening assembly 150 may be positioned within the system 100 prior to the dryer box 130, such that an outlet from the dryer box 130 to the collection bag 280 may be used to collect the finished abrasive product 224. As such, the outlet may serve to transport the finished abrasive product 224 from the dryer box 130 to the collection bag 280. In other words, the screening of the slurry 218 may be accomplished prior to the slurry 218 entering the dryer box 130, such that upon exit from the dryer box 130 the slurry 218 becomes the finished abrasive product 224 that is ready to be collected in the collection bag 280. In alternative embodiments, the outlet may comprise part of the secondary screening assembly 150.

In the illustrated embodiment, the second sensor 104 may be a weight measuring device, such as a load cell, adapted to measure or monitor the amount of recycled abrasive 224 that enters the collection bag 280. As shown, a collection bag 280 can be positioned on the second sensor 104 and positioned underneath the tray 152 so as to catch the recycled abrasive material 224 after it falls through the screen 156. In this manner, as the recycled abrasive material 224 enters the collection bag 280, the second sensor 104 can monitor a characteristic of the abrasive recycling system 100, and more specifically, the weight or amount of abrasive 224 recycled by the abrasive recycling system 100.

Embodiments of the abrasive recycling system 100 may comprise the second sensor 104 being a visual monitoring device, such as a camera, adapted to monitor or view the amount of recycled abrasive 224 that enters, or is contained within, the collection bag 280. For example, the collection bag 280 can be positioned underneath the tray 152 so as to catch the recycled abrasive material 224 after it falls through the screen 156. In this manner, as the recycled abrasive material 224 enters the collection bag 280, the second sensor 104 can monitor a characteristic of the abrasive recycling system 100, such as, for example, the flow rate of the abrasive 224 falling through the screen 156 and/or the amount of abrasive 224 contained within the collection bag 280.

The second sensor 104 can influence the operation of the slurry supply mechanism 101 based on the characteristic monitored thereby. For example, in one embodiment, the second sensor 104 can be a load cell adapted to measure the weight of recycled abrasive 224 contained therein. The second sensor 104, like as described herein with reference to the first sensor 136, can be in electronic communication with the computing device 106 via one or more wires coupled between the second sensor 104 and the computing device 106. The second sensor 104 may alternatively be in wireless electronic communication with the computing device 106. The computing device 106 can include logic and/or be programmed to control the pump 102b thereby adjusting the flow rate of slurry 218 from the intermediate collector 290 to the abrasive recycling system 100. Specifically, once a predetermined weight is monitored by the second sensor 104 and transmitted to the computing device 106, the computing device 106 can be preprogrammed to terminate pumping of the slurry 218 from the intermediate collector 290 into the inlet 110, and furthermore terminate other aspects of the abrasive recycling system 100 so as to not harm the various other components thereof. In other words, the computing device 106 can terminate operation of the pump 102b, along with various other functioning elements of the abrasive recycling system 100, when a specified characteristic is monitored by the second sensor 104 (i.e., a specified weight is monitored). The control of the slurry supply mechanism 101, and hence, the abrasive recycling system 100, in this manner is helpful so as to not overfill a collection bag 280.

Figure 4:
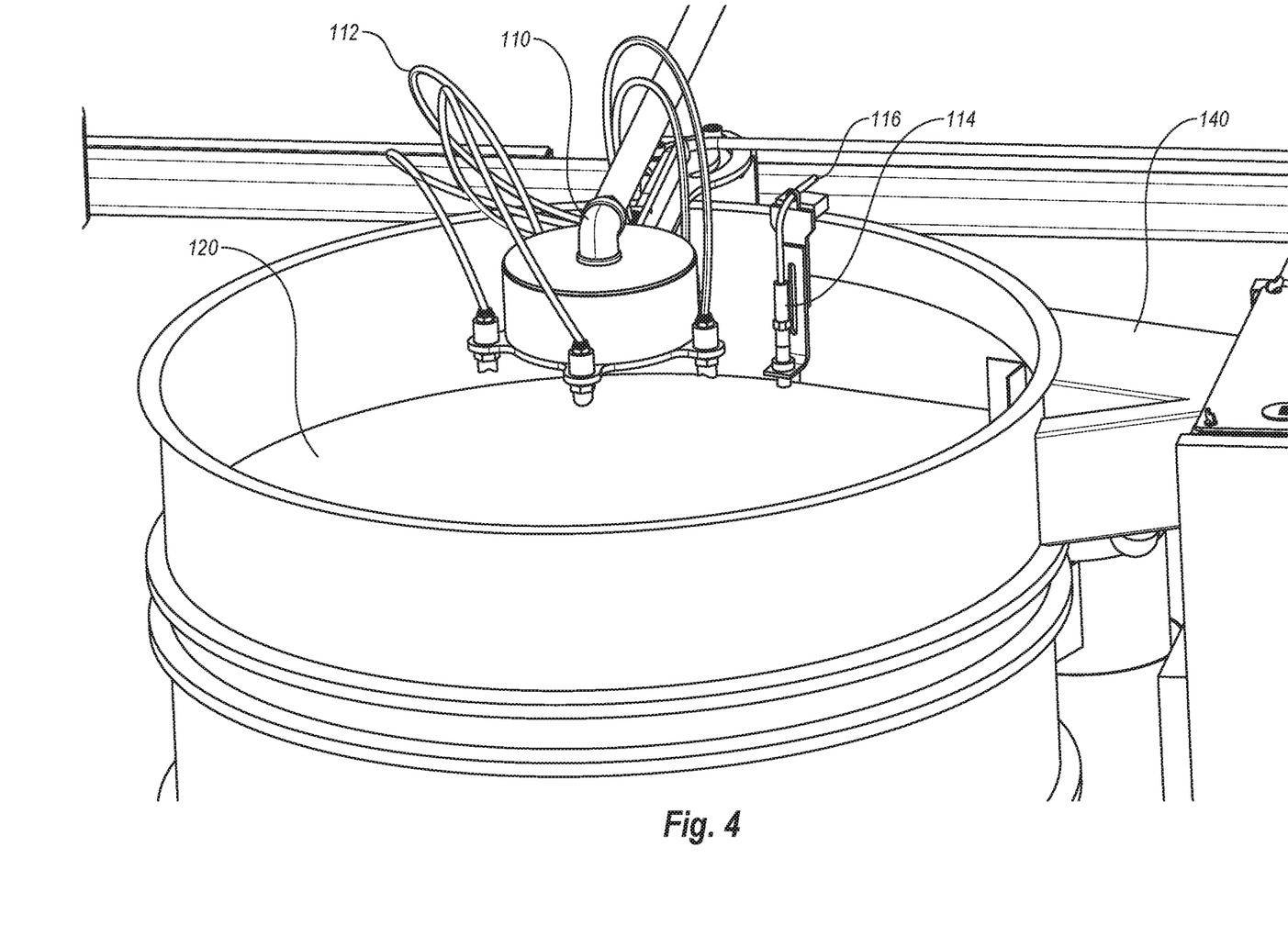
FIG. 4 is a perspective view of a portion of the abrasive recycling system.

Reference being made to FIG. 4, a third sensor 114 may be employed to sense, measure or monitor a characteristic of the abrasive recycling system 100. More specifically, the third sensor 114 may be configured to measure or monitor the amount of fluid or slurry 218 at the initial screen 120. In one embodiment, the third sensor 114 can be a proximity sensor. In another embodiment, the third sensor 114 can be a float switch. In yet another embodiment, the third sensor 114 can be a connectivity sensor. In the illustrated embodiment, the third sensor 114 may be positioned adjacent to the initial screen 120 so as to monitor the level of fluid, slurry 218 or water adjacent to the initial screen 120. In this manner, as the third sensor 114 senses water, or other fluids, at a predetermined level adjacent to the initial screen 120, the third sensor 114 can monitor a characteristic of the abrasive recycling system 100, and more specifically, the level of fluid adjacent to the initial screen 120. Also disclosed are various flush tubes 112 adjacent to the inlet 110. The flush tubes 112 can be employed to deliver streams of water to the initial screen 120 to help clean or otherwise facilitate removal of material from the initial screen 120.

The third sensor 114 can influence the operation of the slurry supply mechanism 101 based on the characteristic monitored thereby. For example, in one embodiment, the third sensor 114 can be a float switch adapted to switch when the water, or other fluid, level at the initial screen 120 reaches a predetermined height. The third sensor 114, like as described herein with reference to the first sensor 136 and the second sensor 104, can be in electronic communication with the computing device 106 via one or more wires 116 coupled between the third sensor 114 and the computing device 106. The third sensor 114 may alternatively be in wireless electronic communication with the computing device 106. The computing device 106 can include logic and/or be programmed to control the pump 102b thereby adjusting the flow rate of slurry 218 from the intermediate collector 290 to the abrasive recycling system 100. For example, once the level of water or other fluid at the initial screen 120 reaches a certain height the third sensor 114 transmits this information to the computing device 106. The computing device 106 can be preprogrammed to terminate pumping of the slurry 218 from the intermediate collector 290 into the inlet 110, and furthermore terminate other aspects of the abrasive recycling system 100 so as to not harm the various other components thereof, once this information is transmitted by the third sensor 114. In other words, the computing device 106 can terminate operation of the pump 102b, along with various other functioning elements of the abrasive recycling system 100, when a specified characteristic is monitored by the third sensor 114 (i.e., the height of the water or other fluid at the initial screen is too high or otherwise exceeds a predetermined limit). The control of the slurry supply mechanism 101, and hence, the abrasive recycling system 100, in this manner is helpful so as to not cause too much water or slurry 218 to be positioned at the initial screen 120 thereby causing the excess water and/or slurry 218 to spill onto the ground and so as to not overwhelm the dryer box 130.

As discussed herein, the first sensor 136, second sensor 104, and the third sensor 114 can be configured to monitor at least one characteristic of the abrasive recycling system 100, the sensors being in electronic communication with the slurry supply mechanism 101 through the computing device 106, and the slurry supply mechanism 101 operating, at least in part, based upon the monitored characteristic(s). The supply of slurry 218 to the abrasive recycling system 100 can be automatically adjusted by one or more sensors 104, 114, 136 transmitting information to the computing device 106 and in response thereto the computing device 106 controlling or otherwise influencing the operation of the slurry supply mechanism 101.

With further reference being made to FIG. 3, embodiments of the recycling system 100 may further comprise the system 100 having component parts thereof being structurally arranged to process slurry to generate recycled abrasive 224, while minimizing the ergonomic footprint of the system 100. For example, the component parts of the abrasive recycling system 100 may be arranged in a substantially vertical arrangement, with component parts being positioned above one another, or sometimes beside one another when advantageous to do so based on operational characteristics of each individual component part, to provide efficient operation of the system 100 and reduce the size and space needed for the system 100 to properly operate. Moreover, by arranging the component parts of the system 100 in this way, the system 100 may advantageously incorporate the effects of gravity to improve the efficiency and operation of the system 100. The system 100 may comprise a frame 105 whereon the component parts of the system 100 may be arranged and coupled or whereby the component parts may be supported. As illustrated herein, the frame 105 may be a cage-type frame whereby the various components of system 100 are substantially enclosed by the frame 105. However, it is understood that various components can be interconnected, such as linked by framing members or coupled directly to each other (i.e., one or more components of system 100 directly coupled to one or more other components of system 100) so as to collectively form its own frame utilizing the structural integrity of such components of system 100.

Embodiments of the system 100 may comprise the frame 105 having vertical supports or vertical support members and horizontal supports or horizontal support members coupled together to form the cage-type frame. The horizontal supports may be configured at a base level, or at or near the bottom of the frame 105, in a square or rectangle to define the ergonomic footprint of the system 100 against, or on, the surface upon which the system 100 rests. The vertical support structures may be coupled to and rise up off the corners of the square or rectangle footprint to define the height of the frame 105. The frame 105 may further comprise a top portion comprising additional horizontal supports to couple to and strengthen, or otherwise reinforce, the vertical support structure. In this way, the frame 105 may comprise a base portion and a corresponding top portion each formed in the shape of a square or rectangle, with vertical support members coupled therebetween to give the frame 105 some height. As described herein, the footprint of the frame 105 may be defined by the lower-most horizontal members of the frame 105. Moreover, the perimeter of the lower-most horizontal members of the frame 105 may define the footprint perimeter of the frame 105, within which many of the components of the system 100 may be positioned, as described in greater detail herein. The footprint perimeter may also extend vertically upward toward the top portion of the frame 105. In other words, the footprint perimeter may be defined by the lower portion of the frame 105 and extend vertically upward, and may even extend vertically above the system 100.

The inlet 110 for the slurry 218 to enter the abrasive recycling system 100 may be arranged above, or over, other component parts of the system 100, such as the initial screen 120. As such, the slurry 218 may be initially pumped to the abrasive recycling system 100 via pump 102(*b*) through tubing to the inlet 110. Gravity may thereafter cause the slurry 218 to fall from the inlet 110 onto the initial screen 120 to allow the screen 120 to remove or otherwise filter the slurry 218 as described herein. The slurry 218 may thereafter transition by gravity, by the flow of slurry 218 or by mechanical force, if needed, to the dryer box 130 through the channel 140, as described herein.

The inlet 110 may be directly coupled to the frame 105 or, in the alternative, may be coupled to other component parts of the system 100 that are coupled to or supported by the frame 105, such that the inlet 110 is functionally coupled to or physically supported by the frame 105 in its appropriate position within the system 100 to thereby adequately and effectively performs its intended functions as described herein. In other words, the term "functionally coupled" or "physically supported by" may suggest that although the inlet 110 may not be directly coupled to or physically supported on the frame 105, other component parts of the system may nevertheless be directly coupled between the frame 105 and the inlet 110, such that the frame 105 may provide substantial rigidity and support to the inlet 110 to allow the inlet 110 to perform its intended function within the system 100.

The dryer box 130 may be advantageously positioned proximate the channel 140, and the channel 140 may be relatively short in length to thereby reduce the distance between the inlet 110 and the dryer box 130 and thereby minimize the size and shape of the system 100, and in particular the lateral or horizontal size and shape. The dryer box 130 may be positioned in a substantially vertical arrangement, or substantially parallel arrangement to the substantially vertical arrangement of the system 100, between the channel 140 and the secondary screening assembly 150 to allow the initially screened slurry 218 to flow or fall by gravity through the dryer box 130. The dryer box 130 may be configured with an exit port 138 to permit the dried slurry 218 to exit the dryer box 130 and enter the secondary screening assembly 150. The exit port 138 may be arranged slightly downward to permit the dried mixture to fall or flow by the added assistance of gravity onto or toward the secondary screening assembly 150.

The dryer box 130 may be arranged in the system 110 to be positioned slightly or partially to the side of either the channel 140, the secondary screening assembly 150, or both. The dryer box 130 may be arranged in the system 100 to have its longer length positioned vertically so that the slurry 218 may pass by gravity through the longer length of the dryer box 130 to achieve maximum drying. As such, it may be advantageous to have the vertically arranged dryer box 130 to thereby reduce vertical space and size.

The dryer box 130 may be directly coupled to the frame 105 or, in the alternative, may be coupled to other component parts of the system 100 that are coupled to or supported by the frame 105, such that the dryer box 130 is functionally coupled to or physically supported by the frame 105 in its appropriate position within the system 100 to thereby adequately and effectively performs its intended functions as described herein. In other words, the term "functionally coupled" or "physically supported by" may suggest that although the dryer box 130 may not be directly coupled to or physically supported on the frame 105, other component parts of the system may nevertheless be directly coupled between the frame 105 and the dryer box 130, such that the frame 105 may provide substantial rigidity and support to the dryer box 130 to allow the dryer box 130 to perform its intended function within the system 100.

The secondary screening assembly 150 may be structurally arranged vertically below the inlet 110 and the initial screen 120 to minimize the lateral size and shape of the system 100. The tray 152 of the secondary screening assembly 150 may be configured to receive the dried mixture from the exit port 138 and transport the dried mixture down the tray 150 and over the secondary screen 156. The tray 152 may be angled slightly downward from the exit port 138 to the secondary screen 156 to allow the effects of gravity to assist with moving the dried mixture down the tray 150. In addition, as described herein, the vibrating feeder 154 may further assist moving the dried mixture down the tray 150. Moreover, the tray 150 may have a size and shape, including a length that directs the dried mixture from the dryer box 130 to the secondary screen 156 positioned substantially under the position of the inlet 110 and the initial screen 120.

The secondary screening assembly 150 may be directly coupled to the frame 105 or, in the alternative, may be coupled to other component parts of the system 100 that are coupled to or supported by the frame 105, such that the secondary screening assembly 150 is functionally coupled to or physically supported by the frame 105 in its appropriate position within the system 100 to thereby adequately and effectively performs its intended functions as described herein. In other words, the term "functionally coupled" or "physically supported by" may suggest that although the secondary screening assembly 150 may not be directly coupled to or physically supported on the frame 105, other component parts of the system may nevertheless be directly coupled between the frame 105 and the secondary screening assembly 150, such that the frame 105 may provide substantial rigidity and support to the secondary screening assembly 150 to allow the secondary screening assembly 150 to perform its intended function within the system 100.

Embodiments of the system 100 may further comprise a vacuum and dust collector assembly 180 positioned advantageously with respect to the secondary screen 156, such that the vacuum force generated by a vacuum may collect, into a dust collector, lighter or less-dense non-abrasive foreign objects from the dried mixture that passes along the tray 152 and over the secondary screen 156, thereby leaving significantly contaminant-free abrasive material to be screened by falling through the secondary screen 156 and collected as recycled abrasive 224. The dust collector assembly 180 may also be used to remove these same particles from the dryer box 130 as the dryer box 130 agitates the slurry 218 during drying.

A collection bag 280, which is configured to collect the recycled abrasive 224 that falls through the secondary screen 156, may also be advantageously placed or positioned vertically below the inlet 110 and the initial screen 120. Such a vertical arrangement minimizes the horizontal or lateral consumption of space by the described component parts of the system 100. Moreover, with the collection bag 280 positioned under the secondary screen 156, the effects of gravity may assist the collection of recycled abrasive 224 as the recycled abrasive 224 falls through, or is otherwise sifted through, the secondary screen 156 and into the collection bag 280.

Embodiments of the system 100 may further comprise the frame 105 defining an abrasive collection region 107 positioned vertically below the secondary screening assembly 150. The abrasive collection region 107 may be defined between the secondary screening assembly 150 and the second sensor 104. The abrasive collection region 107 may be configured by the frame 105 of a size and shape to receive therein the collection bag 280. The frame 105 may define the abrasive collection region 107 to have an opening or access point therein, whereby the collection bag 280 may be inserted into or removed from the abrasive collection region 107. In this way, the collection bag 280 may be inserted into the abrasive collection region 107 to collect the recycled abrasive 224 and thereafter removed from the abrasive collection region 107 when the collection bag 280 becomes full of the recycled abrasive 224 or when a sufficient amount of the recycled abrasive 224 is collected therein. Further, the second sensor 104 may be in operative communication with the abrasive collection region 107, such that when the collection bag 280 is inserted therein, the collection bag 280 is in functional and operative communication with the second sensor 104, as described herein. For example, in some embodiments, the collection bag 280 may be placed in direct contact with the second sensor 104, such as on top of the second sensor 104, to interact with the second sensor 104. In some alternative embodiments, the collection bag 280 may be placed under the second sensor 104, such as vertically below second sensor 104, to interact with the second sensor 104.

As described herein, a second sensor 104 may be positioned under the collection bag 280 to measure or otherwise sense a characteristic of the system 100. Accordingly, the second sensor 104 may also be positioned in substantial vertical alignment with the inlet 110, the initial screen 120, the secondary screen 156, and the collection bag 280. For example, the sensor 104 may be placed vertically above and in operative communication with the collection bag 280, so as to sense a characteristic of the abrasive 224 therein, or, alternatively, as suggested above, the sensor 104 may be placed vertically below and in operative communication with the collection bag 280, so as to sense a characteristic of the abrasive 224 therein, as depicted in FIG. 3.

In the illustrated embodiment, the pumps 102a, b, and c may be positioned in a substantially vertical arrangement with other component parts of the system 100. For example, the pumps 102a, b, c may be arranged under the dryer box 130, which may be offset, as described above, from the substantially vertical alignment of the inlet 110, the initial screen 120, the secondary screen 156, the collection bag 280, and the sensor 104. Placing the pumps 102a, b, and c under the dryer box 130 and substantially proximate the collection bag 280 also allows the various piping lengths of the component tubing of the pumps 102a, b, and c to be minimized, thus reducing cost.

The control box 106 may also be configured to be mounted in a vertical arrangement of the frame of the system 100 to thereby reduce, or at least minimize, the wiring, tubing, and other communication means the control box 106 utilizes to control and direct the operational aspects of the system 100.

Such a vertically arranged design permits the various components of the system 100 to fit relatively well with one another and extend in more of a vertical direction than a horizontal, or lateral, direction, thereby reducing the footprint of the system 100 on the surrounding environment. For example, the inlet 110 and the secondary screening assembly 150 may be aligned in a substantially vertical orientation such that portions of the inlet 110 and the secondary screening assembly 150 intersect a common vertical line 109. Moreover, embodiments of the system 100 may comprise the collection bag 280 and the sensor 104 being aligned in the substantially vertical orientation such that portions of the collection bag 280 and the sensor 104 intersect the common vertical line 109. Embodiments of the system 100 may comprise the common vertical line 109 defining an axis of the system 100, whereby the some of the component parts of the system 100 are centrally positioned about or on the axis or common vertical line 109. For example, the inlet 110, the secondary screening assembly 150, the collection bag 280, and the sensor 104 may be generally aligned in the system 100 about the axis or common vertical line 109 to thereby reduce the horizontal footprint of the system 100 on the surroundings and/or the surface upon which the system 100 rests. Embodiments of the system 100 may further comprise the dryer box 130 being aligned in the substantially vertical orientation such that at least portions of the dryer box 130 intersect the common vertical line 109, and, in some embodiments, the dryer box 130 may even be centered about the axis or common vertical line 109.

The vertically arranged design of the system 100 also advantageously allows the flow of the abrasive slurry 218 to enter the top of the system 100 and work its way down through the system 100 with the assistance of gravity. Furthermore, utilizing the natural effects of gravity to move the slurry 218 through the system 100 keeps the design and operation of the system 100 reliable and simple, thus reducing overall cost.

With reference being made to FIG. 1 FIG. 4, methodology corresponding to the operation of an abrasive recycling system 100 is described.

In one embodiment, a method for operating a liquid jet abrasive recycling system 100 in fluid communication with a liquid jet cutting tool 200 includes supplying a slurry 218 to the abrasive recycling system 100 by a pump 102b, evaporating liquid from the slurry 218 in a dryer box 130, monitoring at least one characteristic of the abrasive recycling system 100 utilizing one or more sensors 104, 114, 136, and adjusting at least one of the following steps (1) supply of slurry 218, or (2) evaporating the liquid, based upon the monitored characteristic. The method may also include the step of collecting recycled abrasive 224 from the slurry 218 after evaporating liquid from the slurry 218. Also, the method may also include measuring the weight of the recycled abrasive 224 at the first sensor 104, such as a load cell. The method may also include measuring the temperature of the slurry 218 during the step of evaporating of liquid from the slurry 218, wherein the temperature is measured using the second sensor 136, such as a thermocouple. The method may also include measuring the moisture level of the slurry 218 during the step of evaporating of liquid from the slurry 218, wherein the moisture is measured using a sensor, such as a humidity level sensor. The method may also include measuring a slurry 218 fluid level before the step of evaporating liquid from the slurry 218 by utilizing a third sensor 114, such as a float switch. The step of adjusting may include automatically adjusting at least one of the following steps (1) supply of slurry 218, or (2) evaporating the liquid, based upon the monitored characteristic.

In one embodiment, the method for operating a liquid jet abrasive recycling system in fluid communication with a liquid jet cutting tool may include supplying a slurry 218 from the liquid jet cutting tool 200 to the abrasive recycling system 100, removing liquid from the slurry 218 to create recycled abrasive 224, monitoring at least one characteristic of the abrasive recycling system 100 utilizing one or more sensors 104, 114, 136, and automatically adjusting, based on the at least one monitored characteristic, the supply of the slurry 218 to the abrasive recycling system 100. According to this method, automatically adjusting can include stopping the supply of slurry 218 to the abrasive recycling system 100. Further according to this method, automatically adjusting can include modifying the supply of slurry 218 to the abrasive recycling system 100.

In one embodiment, the recycling system 100 comprises an inlet 110 for receiving a slurry 218 from a cutting table 250, an initial screen 120 positioned beneath the inlet 110 adapted to receive the slurry 218 from the inlet 110, a dryer box 130 positioned substantially (i.e., a majority thereof) beneath the initial screen 120 wherein the dryer box 130 is adapted to remove liquid from slurry 218, a secondary screen 156 positioned below the inlet 110 and the initial screen 120 wherein the secondary screen 156 is configured to screen larger foreign material from the dried mixture, and a collection bag 280 positioned beneath the secondary screen 156 wherein the collection bag 280 receives recycled abrasive 224 therein.

Although various aspects are illustrated and described herein with reference to specific embodiments, the aspects, in whole and in part, are not intended to be limited to the details shown. Rather, various modifications may be made in the details within the scope and range of equivalents of the claims and without departing from the invention.

What is claimed is:

1. A liquid jet abrasive recycling system, the system comprising:
   a frame having a base structure that contacts a surface on which the system rests, wherein peripheral-most portions of the base structure that contacts the surface define a footprint perimeter of the system;
   a slurry inlet supported by the frame, the slurry inlet configured to receive a slurry, the slurry containing a liquid, foreign particles, and an abrasive;
   a dryer supported by the frame and configured to receive the slurry and remove the liquid therefrom to form a dry mixture;
   an outlet in communication with the dryer to receive the dry mixture, an egress of the outlet being disposed in the footprint perimeter; and
   an abrasive collector in communication with the outlet, the abrasive collector configured to collect the abrasive as it is released from the egress and within the footprint perimeter, wherein the abrasive collector is positioned within the footprint perimeter.

2. The system of claim 1, wherein the slurry inlet, the dryer, and the outlet are positioned within the footprint perimeter.

3. The system of claim 1, further comprising a screening assembly to filter the abrasive and the foreign particles from one another.

4. The system of claim 3, wherein the outlet comprises the screening assembly.

5. The system of claim 1, wherein the frame defines an abrasive collection region that is disposed vertically below the screening assembly and that is configured to receive the abrasive as it is released from the egress and within the footprint perimeter, and wherein the abrasive collector is removably positioned within the abrasive collection region.

6. The system of claim 1, further comprising a pump in operative communication between a liquid jet cutting table and the slurry inlet, the pump configured to provide the slurry to the slurry inlet, the pump being supported by the frame and being positioned within the footprint perimeter.

7. The system of claim 1, further comprising a sensor positioned within the footprint perimeter and in operative communication with the abrasive collector, wherein the sensor measures a characteristic of the abrasive when the abrasive is disposed within the abrasive collector.

8. The system of claim 7, wherein the sensor comprises a load cell that measures a weight of the abrasive when the abrasive is in the abrasive collector.

9. The system of claim 7, wherein the system automatically adjusts operation based on the characteristic of the abrasive when the abrasive is sensed by the sensor.

10. A liquid jet abrasive recycling system, the system comprising:
    a frame having a base structure that contacts a surface on which the system stands, wherein peripheral-most portions of the base structure that contacts the surface on which the system stands define a footprint perimeter of the system, and wherein an axis that is substantially vertically oriented is centrally positioned within the footprint perimeter;
    a slurry inlet functionally coupled to the frame and configured to receive a slurry, the slurry containing liquid, abrasive, and foreign particles;
    a screening assembly functionally coupled to the frame and configured to separate the abrasive from the foreign particles;
    a dryer functionally coupled to the frame and configured to remove the liquid; and
    an abrasive collector positioned within the frame and configured to collect the abrasive, wherein a portion of the abrasive collector, which is configured to receive the abrasive after the abrasive is separated from the foreign particles, intersects the axis.

11. The system of claim 10, wherein the screening assembly receives the slurry from the slurry inlet and filters the foreign particles from the slurry before passing the slurry to the dryer.

12. The system of claim 10, wherein the dryer receives the slurry from the slurry inlet and removes the liquid therefrom before passing a dried mixture of the foreign particles and the abrasive to the screening assembly.

13. The system of claim 10, wherein the portions of each of the slurry inlet and the screening assembly intersect the axis.

14. The system of claim 10, wherein the dryer has a length and is arranged proximate one of the slurry inlet and the screening assembly, the length of the dryer being arranged in a substantially parallel orientation with the axis.

15. The system of claim 10, further comprising a pump in operative communication between a liquid jet cutting table and the slurry inlet, the pump configured to provide the slurry to the slurry inlet, the pump being positioned substantially vertically below the dryer.

16. The system of claim 10, further comprising a sensor in operative communication with the abrasive collector, wherein the sensor measures a characteristic of the abrasive when the abrasive is disposed in the abrasive collector.

17. The system of claim 16, wherein the sensor comprises a load cell that measures a weight of the abrasive in the abrasive collector, and wherein the system automatically adjusts operation based on the weight of the abrasive sensed by the sensor.

18. A method of recycling a liquid jet abrasive, the method comprising:

coupling a slurry inlet to a frame having a base structure that contacts a surface on which the system rests, wherein peripheral-most-portions of the base structure that contacts the surface define a footprint perimeter of the system;

providing a slurry to the slurry inlet;

filtering foreign particles from the slurry in a screening assembly;

drying the filtered slurry from the filtering step in a dryer to remove liquid therefrom and to form a substantially dry mixture; and collecting an abrasive material from the substantially dry mixture in an abrasive collector as the abrasive material is released within the footprint perimeter, wherein the slurry inlet, the dryer, the screening assembly, and the abrasive collector are positioned within the footprint perimeter.

19. The method of claim 18, further comprising pumping the slurry to the slurry inlet by a pump, wherein the pump is positioned within the footprint perimeter.

20. The system of claim 18, further comprising sensing a characteristic of the abrasive material by a sensor when the abrasive material is disposed in the abrasive collector, wherein the sensor is positioned within the footprint perimeter.

* * * * *